C. C. ROSS.
GANG LAWN MOWER.
APPLICATION FILED AUG. 5, 1920.

1,366,947.

Patented Feb. 1, 1921.
7 SHEETS—SHEET 1.

Cleland C Ross, Inventor
By his Attorney
L. P. Whitaker

C. C. ROSS.
GANG LAWN MOWER.
APPLICATION FILED AUG. 5, 1920.
1,366,947.
Patented Feb. 1, 1921.
7 SHEETS—SHEET 2.
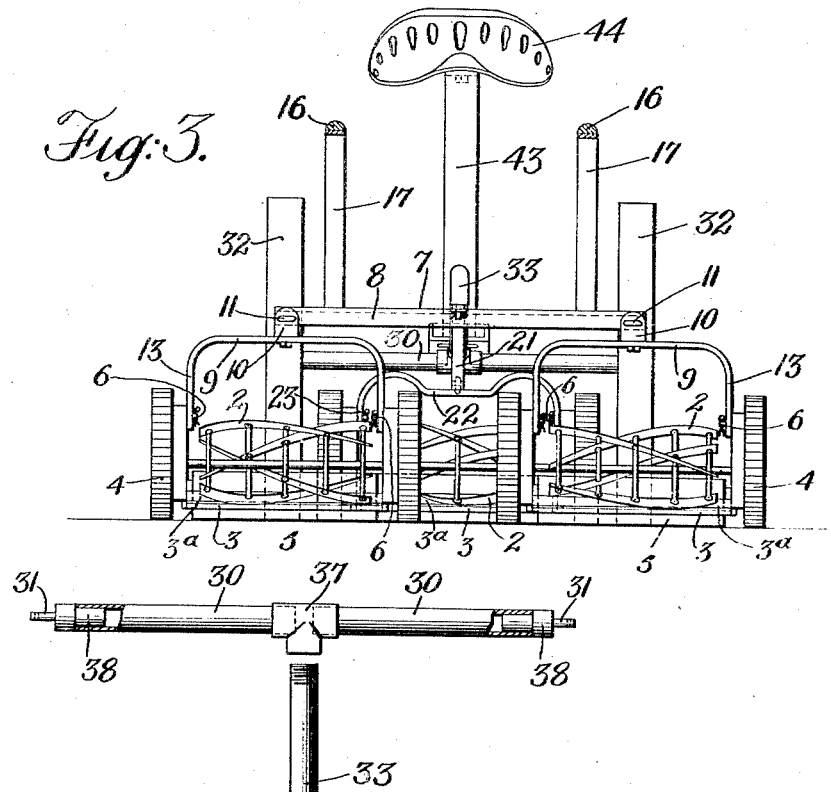
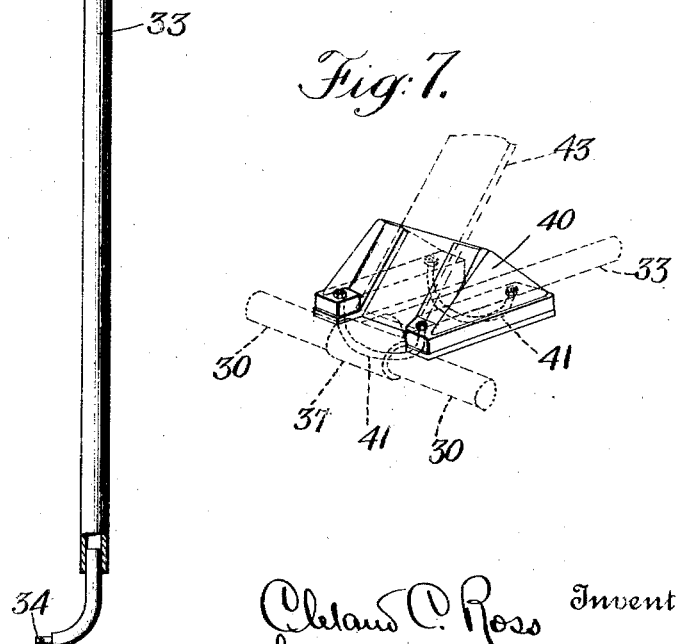
Cleland C. Ross, Inventor
By his Attorney

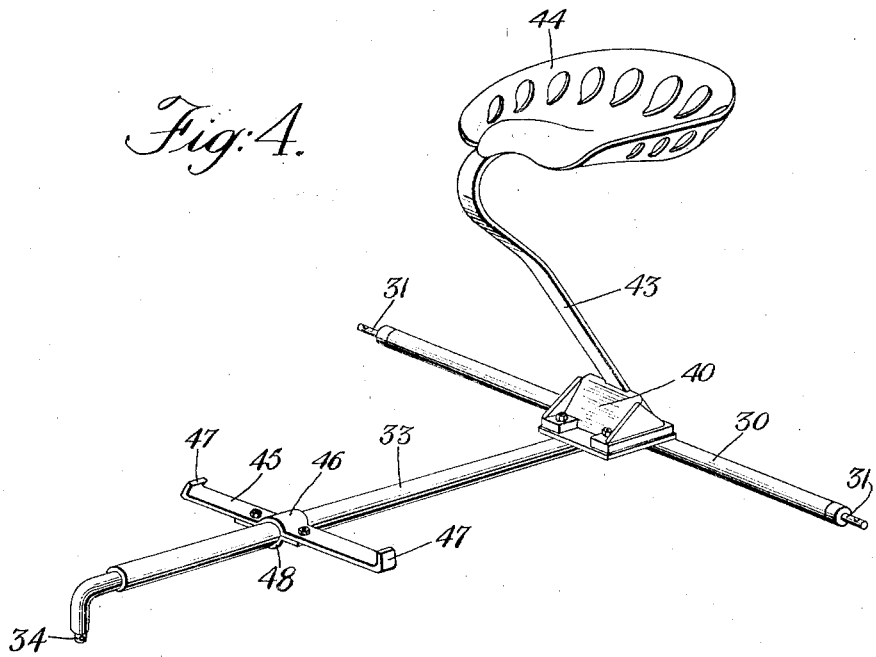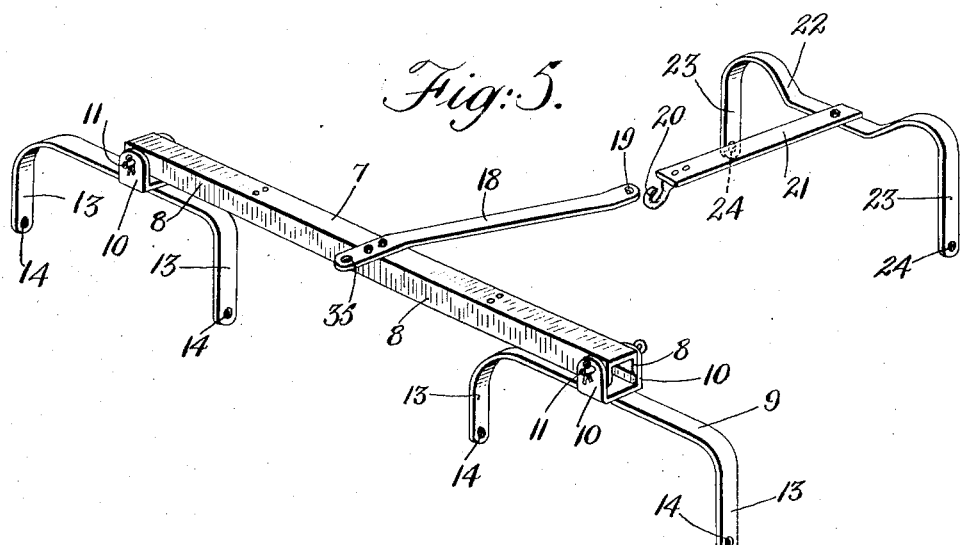

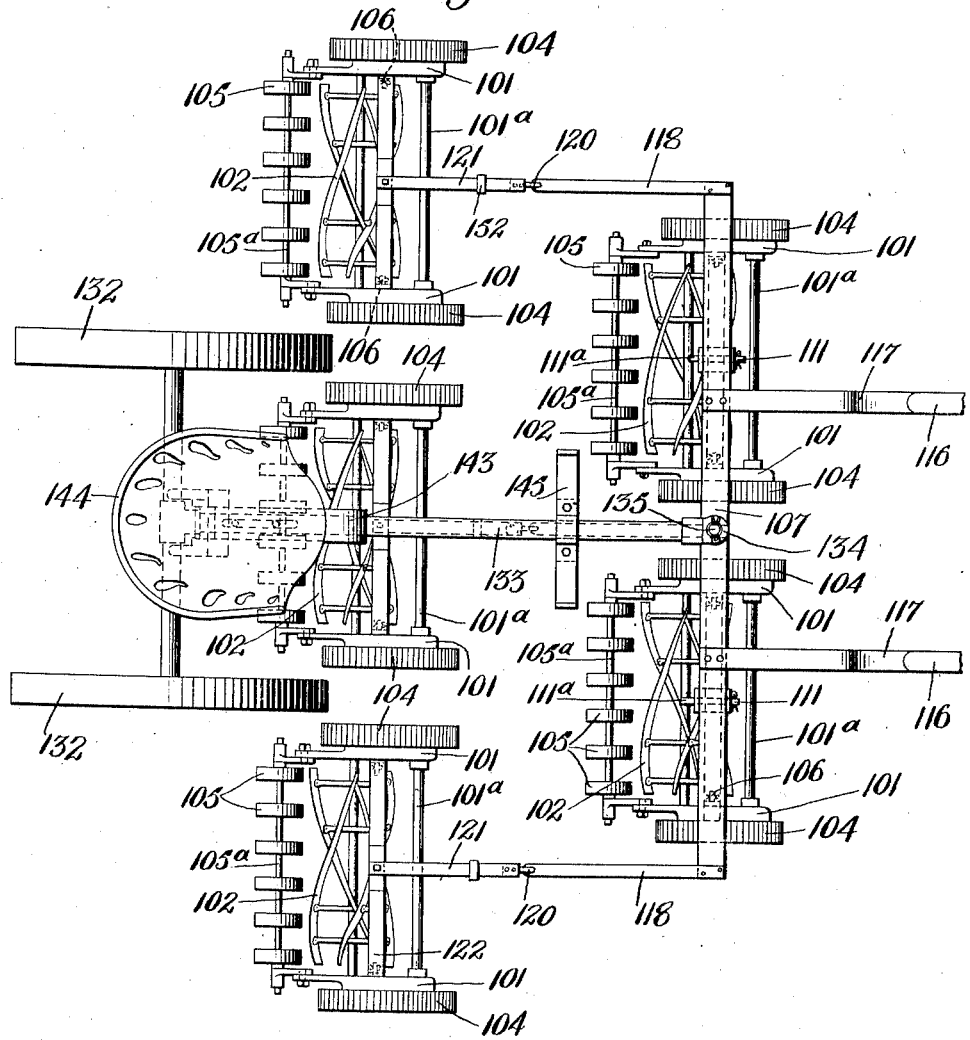

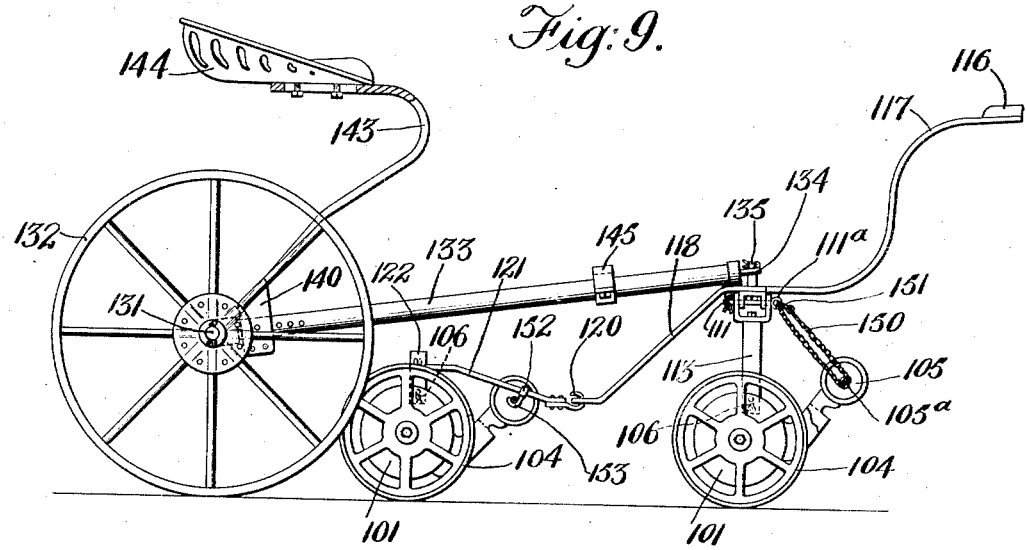
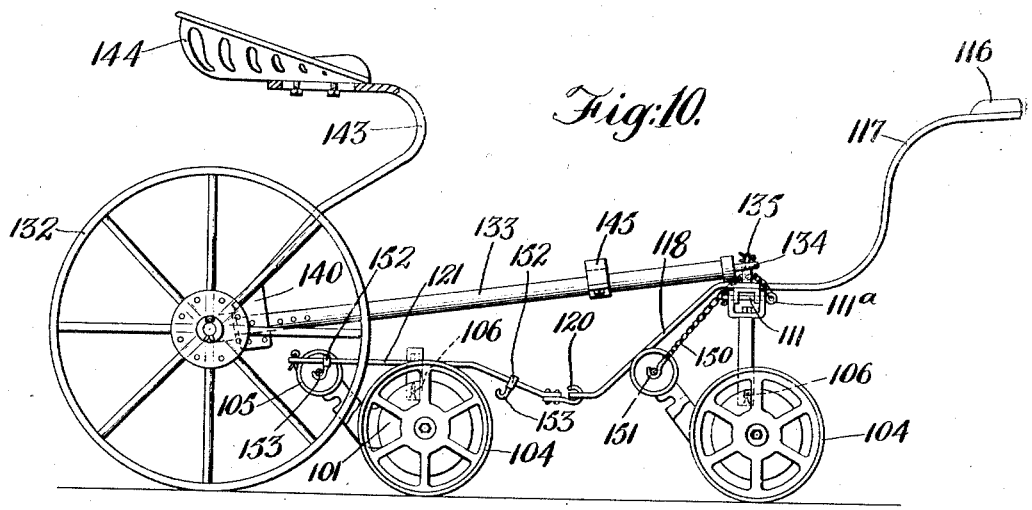

C. C. ROSS.
GANG LAWN MOWER.
APPLICATION FILED AUG. 5, 1920.

1,366,947.

Patented Feb. 1, 1921.
7 SHEETS—SHEET 6.

Inventor
Cleland C. Ross
By L. P. Whitaker
Attorneys

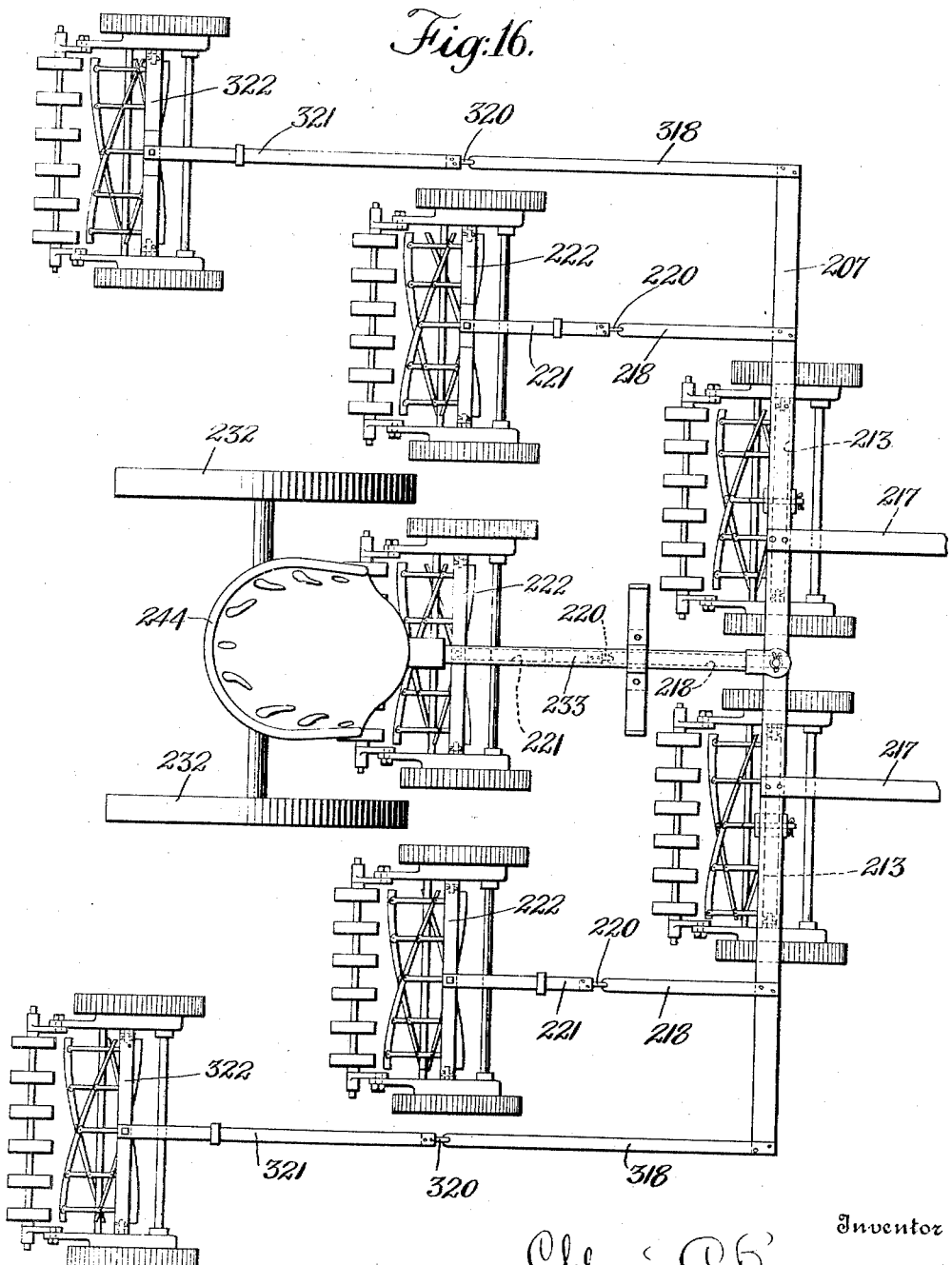

UNITED STATES PATENT OFFICE.

CLELAND COLDWELL ROSS, OF NEWBURGH, NEW YORK.

GANG LAWN-MOWER.

1,366,947.  Specification of Letters Patent.  Patented Feb. 1, 1921.

Application filed August 5, 1920. Serial No. 401,315.

*To all whom it may concern:*

Be it known that I, CLELAND COLDWELL ROSS, a citizen of the United States, residing at Newburgh, in the county of Orange and State of New York, have invented certain new and useful Improvements in Gang Lawn-Mowers; and I do hereby declare the following to be a full, clear, and exact description of the invention, such as will enable others skilled in the art to which it appertains to make and use the same.

My invention consists in the novel features hereinafter described, reference being had to the accompanying drawings which show two embodiments of my invention selected by me for the purpose of illustrating the invention, and the said invention is fully disclosed in the following description and claims.

My invention has for its object to provide a gang lawn mower extremely light and inexpensive, in which the lawn mower units employed may be ordinary stock hand lawn mowers, and in which the objectionable features of the present gang lawn mowers are entirely obviated. In the gang lawn mowers now in use a special lawn mower unit is employed of greater width than ordinary hand mowers, and a frame of considerable weight is superimposed upon some or all of the units, which frame also carries the driver. In the operation of such gang mowers the traction of the wide mower units augmented by the weight of the frame and operator, is frequently a severe load for a single draft animal, and the driving and traction wheels with which the mower units are provided, and which must have sufficient traction to operate the long rotary cutter, frequently cut or sink into the sod and injuriously mark the same, while adding to the load on the draft animal, especially where or when the ground is soft. Furthermore, the weight of the superimposed frame and driver upon the mower units tends to strain the frame construction thereof, comprising the side frames and connecting crossbars with the resulting tendency to interfere with the perfect alinement and operation of the stationary knife and rotary cutter. In accordance with my invention, I employ as the cutting units, preferably two, three, or more ordinary hand lawn mowers which are connected for joint propulsion by an extremely light and simple frame, so constructed as to propel the mower units over the ground and cut a combined swath without any intervening lines of uncut grass, and to provide an auxiliary frame or sulky, carrying its own supporting rotary ground engaging devices, wheels or rollers, for carrying the driver or operator, said auxiliary frame or sulky being so connected to the main frame that the entire weight of the frame and operator, or as much thereof as is desired, according to the adjustment of the driver's seat, shall be carried by the rotary ground engaging devices of the sulky frame, and the main frame thus relieved from this weight, or as much thereof as is desired, thereby relieving the frames of the mower units from injurious pressure and avoiding the marking of the ground by the traction wheels or driving wheels thereof. My invention also includes means for adjusting the driver's seat so that a limited portion of the weight of the driver can be exerted on the main frame if desired for traction purposes, and it further includes means for securing the proper trailing or following of the mower units in the rear rank or ranks of the gang, and means whereby the mower units can be held in inoperative position to enable the machine to be driven from one place to another without cutting, when this is desired, and under such circumstances, to either permit the rotary cutters to idle, or to prevent them from rotating, as may be deemed desirable in view of the distance to be traversed.

In the accompanying drawings,

Fig. 3 is a front elevation of the same.

Fig. 4 is a detail perspective of the trailer frame, detached, and having the wheels removed.

Fig. 5 is a similar view of the skeleton main frame of the machine.

Fig. 6 is a detail view of the axle and drawbar of the trailer frame detached.

Fig. 7 is a perspective view of the seat bracket, showing the adjacent parts in dotted lines.

Fig. 8 is a plan view of a gang mower embodying my invention, and comprising five mower units arranged in two ranks for cutting a wider swath than the machine shown in the preceding figures, and provided with means for holding the mower units out of operative position, while moving the machine from one location to another.

Fig. 9 is a side elevation, partly in section, showing one of my improved gang mowers with the mower units of the front and rear ranks reversed with respect to the main frame, and held in inoperative position.

Fig. 10 is a similar view showing another way in which the mower units of the front and rear ranks can be held in inoperative position, without reversing their positions with respect to the frames.

Fig. 16 is a plan view of a three rank machine.

Figure 1:
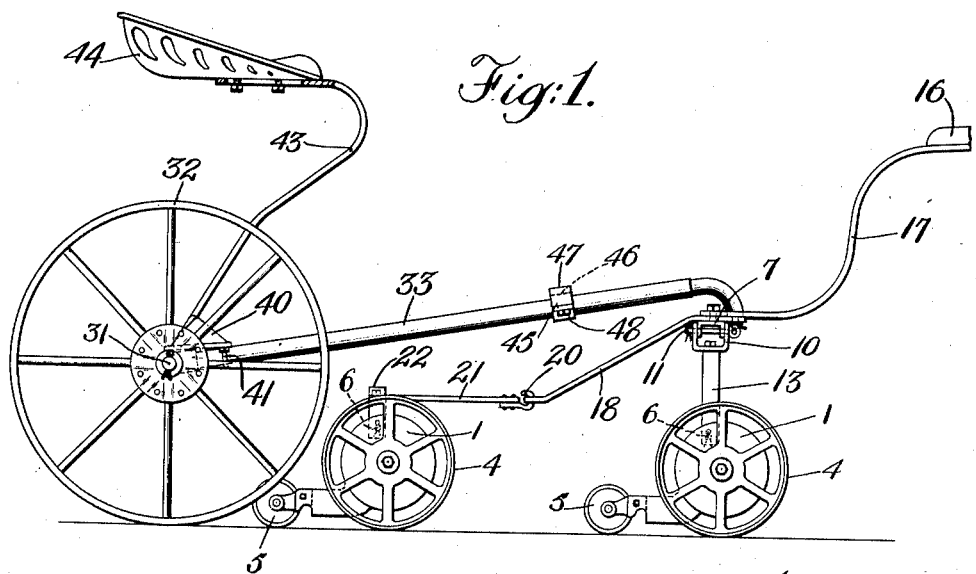
Figure 1 represents a side elevation of a gang lawn mower containing one embodiment of my invention.
Figure 2:
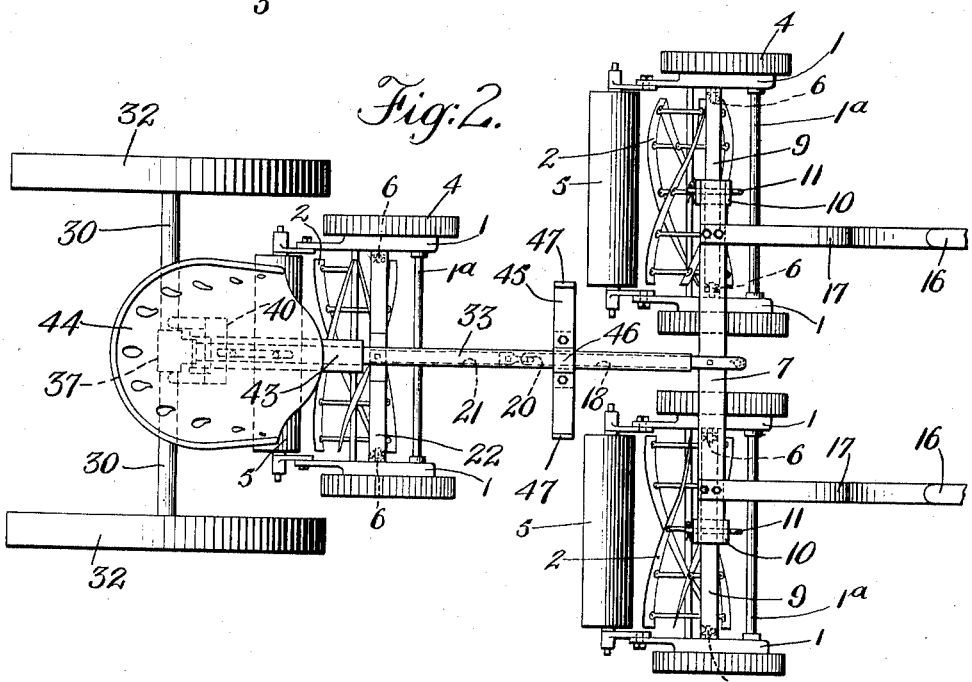
Fig. 2 is a top plan view of the same.
Figure 11:
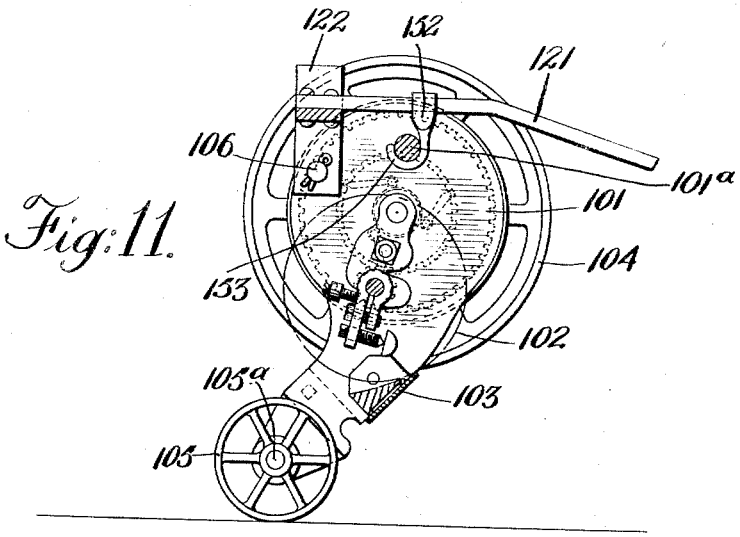
Fig. 11 is a detail view of one of the units of the rear rank of one of my improved gang mowers showing the ground wheels supported out of contact with the ground, and the mower unit resting upon the rear roller thereof, for moving the machine from one place to another without driving the rotary cutter.

In carrying out my invention I prefer to employ as the mower units two, three or more ordinary hand lawn mowers, such as have usually been simply pushed over the lawn by hand. The construction and operation of the hand lawn mower is so well known that I will not describe it particularly except to say that it comprises side frames 1—1, carrying the rotary cutter 2, and a stationary knife 3, the frames being rigidly connected by the stationary knife bar 3ª, and one or more cross bars 1ª, and supported by two light traction wheels 4, which are operatively connected with and drive the rotary cutter, through the usual and well known pawl and ratchet mechanism or other clutch mechanism which permits the wheels to turn freely in the reverse direction without driving the rotary cutter, for example, as indicated in Fig. 11, and a rear roller 5, usually of wood, which supports the side frames at the rear thereof and is vertically adjustable in any desired manner, as by bolts passing through slots in the roller hangers for regulating the height of cut.

The side frames 1 are ordinarily provided on their inner faces with studs 6 to which the handle bail is attached when the unit is used as a hand lawn mower. The only change which I prefer to make in the construction of the individual mower units is to provide them with a rear roller or series of rollers 5, of larger diameter than those usually supplied where the units are propelled by hand. The increased diameter of the rear rollers causes them to roll more easily over rough or uneven turf or ground, and provides sufficient weight at the rear ends of the frames to hold the rollers at all times in contact with the turf, and this insures an even cut by preventing the rear ends of the units from jumping in passing over uneven surfaces. The mower units so constructed require comparatively little traction to drive the rotary cutters, which may be of any usual or desired length and the traction wheels do not sink into or mark the turf to any appreciable extent.

In my improved gang mower the units are connected so that they operate practically as if they were being pushed by hand, while they are so connected as to cut a wide combined swath, and provision is made for carrying an operator or driver on a separate frame, which I term the sulky, without adding such a material portion of his weight as to unduly increase the draft load, or cause the traction and driving wheels of the units to cut into or injuriously mark the sod, and if desired, practically the entire weight of the driver can be carried by the supporting wheels of the sulky frame, thus relieving the mower units almost entirely or entirely therefrom.

To this end I employ a light skeleton frame for connecting the mower units, one form of which is illustrated in detail in Fig. 5, and which, as therein shown, comprises the following elements. 7 represents a transversely disposed channel bar preferably of iron or steel, with the lateral flanges 8—8 extending downwardly. 9—9 represents yokes or bails for connecting the front mower units to the channel bar 7, each of said yokes being provided centrally with upturned ears 10, pivotally connected to the flanges of the channel bar, within or outside of the same, by a bolt 11, having a head at one end and an aperture at the other to receive a cotter pin. Each yoke 9 is provided with downwardly extending arms 13—13, provided at their lower ends with apertures 14, which pivotally engage the bail studs 6 on the side frames of the mower units with which they are connected, and the yokes are preferably secured to the studs by cotter pins extending through the latter.

Suitable draft appliances, preferably a pair of shafts 16 are connected to the channel bar 7, as by means of flat metal bars 17, the rear ends of which are bolted or screwed to the bar 7, as shown for example, or such draft appliances may be secured in any other desired way.

Centrally of the channel bar I provide a rearwardly extending reach bar 18 provided with an aperture 19 in its end, which is pivotally engaged by a hook 20 secured to the forward end of a draft bar 21 the rear end of which is bolted or otherwise secured centrally of a yoke 22 having downwardly extending arms 23 provided at their lower ends with holes 24 to pivotally engage the bail studs of a third mower unit, to which studs they are secured by cotter pins. The pivotal connection between the reach bar 18 and draft bar 21 is located preferably exactly centrally between the axis of the driving wheels of the mowers of the front and rear ranks, and this exact spacing of the mowers with respect to said pivotal connection (or connections if more than three mower units are used as hereinafter described), forces the mower units of the rear rank to trail at all times in proper cutting relation to the units of the front rank. The construction and arrangement of the frame is such that the mowers of the front rank will be spaced a distance apart laterally slightly less than the cutting width of a mower of the rear rank, so that the swath cut by the mower units will be nearly equal to the combined cutting widths of the mowers of the front and rear ranks. It will be seen that while this frame is exceedingly light, it is sufficient rigid to hold the mowers at all times in their proper relative positions, and to enable them to be simultaneously propelled over the ground.

In order that the operator may be carried with the machine, so as to drive the draft animal, without adding his weight upon the traction wheels of the mower units, I provide an auxiliary frame which I term the trailing frame, or sulky frame, shown in detail in Fig. 4, which is supported upon its own wheels, which are preferably of much greater diameter and width than the traction wheels of the mower units, said wheels having broad flat treads or tires which will not cut into the lawn or sod, and said trailing frame being provided with means as a driver's seat and foot rest, for supporting the driver.

In the embodiment of my invention shown herein, the trailing or sulky frame comprises a horizontal axle 30, preferably composed of pipe having wheel engaging trunnions 31 upon which are mounted the large flat rimmed wheels 32, held in place by cotters, or otherwise. To the center of the axle 30 is secured a forwardly extending draw bar 33 provided at its forward end with a downwardly extending portion 34 for pivotally engaging the channel bar 7 or a part connected therewith. I prefer to form the axle 30 of two separate pieces of pipe, united to each other and to the draw bar 33 by a T coupling 37, as shown in Fig. 6, and to provide the trunnions 31 of castings or forgings 38, driven into and attached to the axle sections, but I do not limit myself to these constructions. In the drawings, Figs. 1 to 7 inclusive, I have shown the reach bar 18 extending forward of the channel bar 7 and provided with a hole 35 to receive the pivoted part 34, which may be secured in position by a cotter pin, or other desired means. I provide the sulky frame, preferably at the intersection of the draw bar 33 and axle 30, with a seat supporting bracket or casting 40, one form of which is illustrated in detail in Fig. 7, clamped in position by suitable bails 41 and provided with a recess or socket to receive the lower end of the seat standard 43 to the upper end of which is secured the driver's seat 44. I prefer to locate the bracket 40 so that it rests upon the draw bar 33 and upon the axle 30 at each side thereof, thus supporting it and the driver's seat firmly. I also prefer to provide the draw bar 33 with a foot rest comprising a transverse bar 45 having a curved central portion 46 to fit over the bar 33, and having its outer ends turned upward as at 47, the foot rest being held in place by a clamp 48, and bolts and nuts (or screws) uniting it with the foot rest. By loosening these nuts the foot rest may be adjusted longitudinally of the draw bar, and I prefer to provide for adjusting the driver's seat backward or forward upon the upper end of the supporting standard 43, which may be slotted as shown, or provided with additional bolt holes for this purpose, in a well known way, so that by adjusting the seat and foot rest, one or other, or both, as may be desired, substantially the entire weight of the driver may be carried by the large wheels 32 of the trailer frame, and no material portion of the weight of the driver or trailer frame will come upon any of the mower units.

The driver will thus be carried with the machine, so as to guide and direct its movements, without causing the traction wheels of the mower units to cut into or mark the sod. It will also be noted that the skeleton frame, while it holds the mower units in proper relation, adds very little weight upon the traction wheels, and the mowers are readily drawn along and cut the grass as if each individual unit were being propelled by hand. The draft of the machine is extremely light and is readily sustained by one horse for a day's work without undue fatigue. All the advantages of the gang mower with its wide swath are obtained without the objectionable features before referred to, and the machine is very inexpensive to manufacture.

Figure 13:
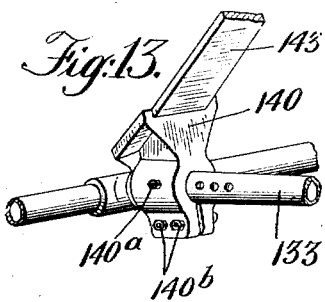
Fig. 13 is a detail view of another form of seat-clamp for the sulky frame providing means for adjusting the seat bodily with respect to the draw bar of the sulky frame.
Figure 14:
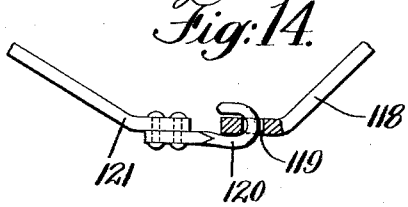
Fig. 14 is a detail view, partly in section, showing the pivotal connections which I may conveniently employ for connecting the draft bars of the mower units of the rear rank with their respective reach bars on the main frame.

It is to be understood that in carrying out my invention, any desired number of units can be employed. In the mechanism I have just described, I have shown a gang lawn mower comprising three units, and in Fig. 8 I have shown a gang mower comprising five units, two arranged in the front rank, and three in the rear rank, but I do not limit myself to the exact number of units in either rank. In the machine shown in Fig. 8, the additional units are added in the rear rank, the units themselves being of the same construction as heretofore described, with the exception that in this figure I have shown, in place of a solid wooden roller for supporting the rear end of each unit, a light shaft 105$^a$ is shown provided with a series of comparatively narrow rollers 105. The various parts of the apparatus shown in Figs. 8, 9, and 10 are substantially identical with those previously described, and are indicated by numbers corresponding thereto, with the addition of 100 for convenience of reference, and it will not therefore be necessary to describe the entire machine in detail. In the five unit machine the channeled frame bar 107 is extended laterally at each end and provided with an additional reach bar 118, to which is connected the draft bar 121 by means of the hook shaped connection 120 engaging an aperture 119 in the reach bar, in the manner illustrated in detail in Fig. 14, and forming a pivotal connection midway between transverse vertical planes passing through the axes of the ground wheels or traction wheels of the mowers of the front and rear rank, thus causing the outer mower units of the rear rank to follow at all times the front rank units, as previously described with respect to the central mower of the rear rank. In some instances it will be desirable, I find, to adjust the seat bracket upon the draft bar 133 of the sulky frame, instead of or in addition to the relative adjustment provided between the seat 144 and the supporting spring 143, and in Fig. 13 I have illustrated such a construction. In this figure 140 represents the seat bracket which is provided with an aperture fitting the draft bar 133, and is secured thereto by means of a bolt 140$^a$ extending through the bracket or casting and through the draft bar, which is provided with a series of apertures at different distances from the axle, longitudinally of the machine, so that the casting or bracket can be adjusted to different positions on the draft bar, longitudinally, and prevented from turning thereon. The bracket 140 is provided with a recess to receive the lower end of the standard or spring 143, which supports the seat. I prefer to split the lower portion of the bracket or casting 140 below the aperture therein, and to connect the lips so formed by bolts 140$^b$, as shown, for the purpose of clamping the walls of the aperture in the bracket rigidly on the draft bar, if desired, but this is not essential.

Figure 15:
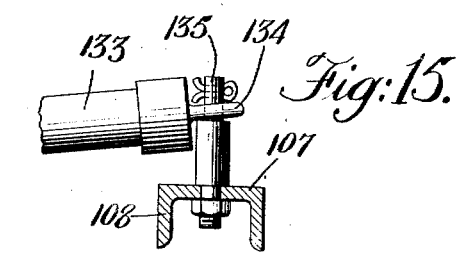
Fig. 15 is a detail view of another form of pivotal connection which I may employ for connecting the forward end of the sulky frame draft bar with the main frame of the machine.

In Figs 9 and 19 I have shown the forward end of the draft bar 133 provided with an eye 134 engaging the shouldered stud 135 secured to the channel bar 108, as shown in Fig. 15, this being another way of forming the pivotal connection between the draft bar of the sulky frame and the channel bar or main frame of the machine.

Figure 12:
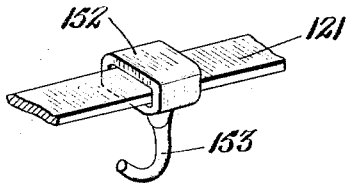
Fig. 12 is a detail view of one of the sliding supporting hooks which I conveniently employ for maintaining the mower units of the rear rank in inoperative position.

In the use of the machine herein shown, it is often desirable to move it from one part of the field to another, or along a country road, without cutting. My improved construction provides means for accomplishing this result in several ways. I provide, adjacent to each of the cutter units, a device for holding the cutting mechanism in raised position, out of operative relation with the ground. In the present instance I have shown a chain 150 provided for each of the units of the first rank, the said chain being conveniently connected to some part of, or connected with, the transverse frame bar, as for example by the bolt 111, which in this instance is provided with an eye 111$^a$ to receive one end of the chain, the other end being provided with a hook or other attaching means by which it can be hooked onto the shaft 105 and the rear roller (or it could be passed around the rear roller and hooked into a link of the chain in case a wood roller were employed), thus holding the rear end of the unit elevated and the cutting mechanism out of operative relation. In connection with the units of the rear rank, while I may also employ a chain connected with the draw bar 121 (or 21) thereof, I prefer to use the device shown in Figs. 9, 10 and 11, and in detail in Fig. 12, which comprises a sleeve 152 so mounted on the draw bar 121 as to be movable longitudinally thereof, and carrying a hook or supporting member 153, so constructed as to readily engage either with the cross bar 101$^a$ of the machine, as indicated in Fig. 11, or the rear roller shaft 105$^a$, as shown in Figs. 9 and 10.

It will also be understood that the yokes 122 or 22 of the several mower units are connected to the mower units detachably and reversibly, that is to say, by simply removing the cotter pins passing through the lugs 6 or 106, these yokes can be detached by springing in the ends slightly, and the mower units can be reversed and again connected to the yokes, so as to be drawn backward, when by reason of the ratchet and pawl, or other clutch connection between the driving wheels and the rotary cutter, the rotary cutter will not be revolved by the driving wheels, as will be readily understood. It will therefore be understood that each of the cutting units can be reversed with respect to its yoke, and the cutting mechanism then elevated out of operative position and secured, as hereinbefore described, by means of the chain 150 and the supporting device 153, as shown for example in Fig. 9, in which case as the machine is drawn from one place to another, the traction wheels of the mower units will be turned in reversed directions, and will not drive the rotary cutter, which will remain stationary, and this will be found to be the preferable arrangement where a considerable distance is to be traversed.

If, however, the distance to be traversed is short and the condition of the ground is such as not to be likely to injure the rotary cutters, if they are caused to revolve idly, the rear end of each cutting unit of the front rank can be supported out of operative position without reversing it, as shown in Fig. 10. The rear ends of the rear cutting units can be supported in like manner by extending the draft bar 121 in rear of the yoke and providing it with another slide 152 and hook 153, as shown in Fig. 10, or the traction rollers of the rear rank mower units can be raised from the gound and supported in raised position by passing the hook 153 beneath the front cross bar 101$^a$ (or 1$^a$) of the unit as shown in Fig. 11, thereby holding the traction wheels of the rear rank mower units out of contact with the ground, and supporting the rear mower units upon their rear rollers. In either of these ways the machine can be moved from one field to another or along a road without cutting, although the rotary cutters will be revolved in the case of those units whose traction rollers or wheels engage the ground, as will of course be understood.

It will also be understood that the mower units of the front rank can be reversed with respect to the main frame bar or channel bar, by removing the pivotal connections 111 and reversing both the mower units and their yokes, if this should be deemed desirable, but it will be found simpler to reverse the units with respect to their yokes when it is desired to have the machines drawn rearwardly, so as not to rotate the rotary cutters.

I prefer to so construct the reach bars of the frame, and the draft bars of the bails of the trailing mower units, that the drawing forward of said units as the machine passes over the ground, will not tend to draw upwardly, and so lessen the traction wheels, but on the contrary, will draw downwardly and thus tend to hold the traction wheels in tractive engagement with the ground. Thus in Figs. 9 and 10 I have illustrated one arrangement for accomplishing this result. As therein shown the reach bars 118 are bent downwardly so that the draft aperture in its lower end is at or below, and preferably below, the level of the attaching studs 106 to which the bails 122 of the trailing units are pivotally secured, and the draft bar 121 connected to each trailing unit of the second (or third) rank also extends downwardly as shown, and is pivotally connected to the reach bar by the hook 120 (or otherwise) so that the pivotal connection is below the level of the studs 106. This effects a slight downward draft on the rear or trailing units and tends to hold the traction wheels in engagement with the ground and to prevent any tendency to lessen their traction.

In carrying out my invention I wish it to be understood that I may employ any desired number of machines, arranged in any desired number of ranks. In Fig. 16, for example, I have illustrated the frame of a gang lawn mower provided with seven mower units arranged in three ranks, for the purpose of illustrating the wide applicability of my invention. In this figure the channel bar, indicated at 207, carries the bails 213, of the two units of the front rank, shown in dotted lines, said channel bar being extended laterally at both sides of the machine, and being provided with three reach bars 218 for the trailing mower units of the second rank, and at opposite ends with additional reach bars 318 for two mower units of the third rank. Each of the units of the second rank is provided with a bail 222 and draft bar 221 having a pivotal connection with a reach bar 218 located midway between vertical transverse planes passing through the axes of the traction wheels of the first and second rank, and each of the third rank mower units is provided with a bail 322 connected to a draft bar 321, which is pivotally connected to the reach bars 318 at points midway between vertical transverse planes passing through the axes of the traction wheels of the units of the first and third ranks. The sulky frame may be connected with the transverse frame bar 207 in the same manner as hereinbefore, and as shown for example in Fig. 8, or obviously the length of the draft bar 233 thereof could be varied if found desirable.

What I claim and desire to secure by Letters Patent is:—

1. In a gang lawn mower the combination with a plurality of mower units, each provided with cutting mechanism, and traction devices for operating the same, a main frame connecting said units for joint propulsion over the ground, and holding them in proper relative positions to cut a combined swath, said frame being supported by certain of said units, draft appliances secured to said main frame for attaching a draft animal thereto, a trailing sulky frame, independent of said main frame, and the connections of the mower units therewith, said sulky frame being pivotally connected with said main frame and provided with supporting wheels independent of the traction wheels of said units, and means for supporting a driver carried by said sulky frame.

2. In a gang lawn mower the combination with a plurality of mower units, each provided with cutting mechanism, and traction devices for operating the same, a main frame connecting said units for joint propulsion over the ground, and holding them in proper relative positions to cut a combined swath said frame being supported by certain of said units, draft appliances secured to said main frame for attaching a draft animal thereto, a trailing sulky frame, independent of said main frame, and the connections of the mower units therewith, and sulky frame having a single pivotal connection with the main frame located centrally with respect to the lateral width of the machine, said pivotal connection permitting the sulky frame to move vertically and laterally with respect to the main frame, supporting wheels for the sulky frame, and means for supporting a driver carried by the sulky frame.

3. In a gang lawn mower, the combination with a plurality of mower units, each provided with cutting mechanism, and traction devices for operating the same, and a main frame connecting said units for joint propulsion over the ground, and holding them in proper relative positions to cut a combined swath, of a separate sulky frame, comprising an axle, supporting wheels, independent of the traction devices of the mower units, a draw bar connected with said axle and having its forward end pivotally connected with the main frame, and a driver's seat secured to said sulky frame, and located adjacent to said axle.

4. In a gang lawn mower, the combination with a plurality of mower units, each provided with cutting mechanism, and traction devices for operating the same, and a main frame connecting said units for joint propulsion over the ground, and holding them in proper relative positions to cut a combined swath, of a separate sulky frame, comprising an axle, supporting wheels, independent of the traction devices of the mower units, a draw bar connected with said axle and having its forward end pivotally connected with the main frame, and a driver's seat secured to said sulky frame, and located adjacent to said axle, and means for adjusting the driver's seat longitudinally of the machine with respect to the supporting wheels of the sulky frame.

5. In a gang lawn mower, the combination with a plurality of mower units, each provided with cutting mechanism and traction devices for operating the same, and a main frame, connecting said units for joint propulsion over the ground, and holding them in proper relative positions to cut a combined swath, of a separate sulky frame separate from the main frame, comprising an axle, a draw bar rigidly connected therewith, and having its forward end pivotally connected to the main frame, a seat bracket connected to said draw bar adjacent to the axle, a driver's seat secured to said bracket, and supporting wheels independent of the traction devices of the mower units, engaging said axle, and supporting it and the driver's seat.

6. In a gang lawn mower, the combination with a plurality of mower units, each provided with cutting mechanism, and traction devices for operating the same, and a main frame, connecting said units for joint propulsion over the ground, and holding them in proper relative positions to cut a combined swath, of a separate sulky frame separate from the main frame, comprising an axle, a draw bar rigidly connected therewith, and having its forward end pivotally connected to the main frame, a seat bracket connected to said draw bar adjacent to the axle, a driver's seat secured to said bracket, and supporting wheels independent of the traction devices of the mower units, engaging said axle, and supporting it and the driver's seat, and means for adjusting said seat bracket longitudinally of said draw bar.

7. In a gang lawn mower, the combination with a plurality of mower units arranged in a plurality of ranks, of a yoke pivotally connected to each mower unit, a transverse frame bar pivotally connected to the yokes of a plurality of mower units in one rank, by pivots extending parallel to the line of draft, a draw bar connected to the yoke of a mower unit of another rank, said bar having a pivotal connection with a part connected with said transverse frame bar, and a separate frame provided with supporting wheels, and a driver's seat supported thereby, and having a pivotal connection with a part connected with said transverse frame bar.

8. In a gang lawn mower, the combination with a plurality of mower units arranged in a plurality of ranks, of a yoke pivotally connected to each unit, a transverse frame bar for connecting two units of one rank, pivotal connections between said bar and the yokes of said units, a reach bar connected to said frame bar, and a draft bar connected to a yoke of a mower unit in another rank, and having a pivotal connection with said reach bar, and a separate frame provided with a driver's seat and supporting wheels, said separate frame being pivotally connected with a part connected with said frame bar.

9. In a gang lawn mower, the combination with a plurality of mower units, arranged in a plurality of ranks, each of said mower units comprising side frames, cutting mechanism, traction wheels for operating the same, and rear supporting rollers, and having yoke engaging studs on said side frames, of a yoke for pivotally engaging the said lugs of each mower unit, a transverse frame bar pivotally connected with a plurality of said yokes, and conencting the mower units engaged thereby, in one rank, a draw bar rigidly secured to the yoke of a mower unit, located in a different rank, and connections between said draw bar and said frame bar, including a pivotal connection.

10. In a gang lawn mower, the combination with a plurality of mower units, each comprising side frames, cutting mechanism, traction wheels, for operating the same, and rear supporting rollers, and having yoke engaging studs on said side frames, of a yoke for pivotally engaging the said lugs of each mower unit, a transverse frame bar pivotally connected with a plurality of said yokes, for connecting the mower units thereof in one rank, a draw bar rigidly secured to a yoke of a mower unit, in a different rank, connections between said draw bar and said frame bar including a pivotal connection with said frame bar, a sulky frame comprising an axle, supporting wheels therefor, a driver's seat carried thereby, and a draw bar connected with said axle and having a pivotal connection with said frame bar.

11. In a gang mower, the combination with a plurality of mower units arranged in a plurality of ranks, each unit comprising side frames, traction wheels and ground rollers supporting said frames, a stationary knife and a rotary cutter operatively connected to a traction wheel, of a vertically and transversely disposed yoke pivotally connected to the side frames of each unit, a transverse frame bar pivotally connected to the yokes of a plurality of mower units of one rank, a draft bar connected to the yoke of a mower unit of another rank, connections between said draft bar and said frame bar, including a pivotal connection, and means adjacent to each of said units for holding the cutting mechanism thereof out of operative position.

12. In a gang mower the combination with a plurality of mower units arranged in a plurality of ranks, each unit comprising side frames, traction wheels and ground rollers supporting said frames, a stationary knife and a rotary cutter operatively connected to a traction wheel, by pawl and ratchet mechanism, of a vertically and transversely disposed yoke pivotally connected to the side frames of each unit, a transverse frame bar pivotally connected to the yokes of a plurality of mower units of one rank, a draft bar connected to the yoke of a mower unit of another rank, connections between said draft bar and said frame bar, including a pivotal connection, and means adjacent to each of said units for holding the cutting mechanism thereof out of operative position, said mower units being detachably and reversibly secured in relation to said frame bar and draft bar, whereby they may be reversed to enable the rotary cutters of said units to remain at rest when moving the machine from one place to another.

13. In a gang mower the combination with a plurality of mower units arranged in a plurality of ranks, each unit comprising side frames, traction wheels and ground rollers supporting said frames, a stationary knife and a rotary cutter operatively connected to a traction wheel, of a vertically and transversely disposed yoke pivotally connected to the side frames of each unit, a transverse frame bar pivotally connected to the yokes of a plurality of mower units of one rank, a draft bar connected to the yoke of a mower unit of another rank, connections between said draft bar and said frame bar, including a pivotal connection, means for holding the cutting units connected with said frame bar out of operative position, and a supporting device on said draft bar, for holding the cutting mechanism of the mower unit connected therewith, out of operative relation to the ground.

14. In a gang mower, the combination with a plurality of mower units arranged in a plurality of ranks, each unit comprising side frames, traction wheels and ground rollers supporting said frames, a stationary knife and rotary cutter operatively connected to a traction wheel, of a vertically and transversely disposed yoke pivotally connected to the side frames of each unit, a transverse frame bar pivotally connected to the yokes of a plurality of mower units of one rank, a draft bar connected to the yoke of a mower unit of another rank, connections between said draft bar and said frame bar, including a pivotal connection, means for holding the cutting units connected with said frame bar out of operative position, a slide movable longitudinally on said draft bar, and a supporting hook carried by said slide for engaging a part of the adjacent mower unit for holding said units out of operative relation with the ground.

15. In a gang mower, the combination with a plurality of mower units arranged in a plurality of ranks, each unit comprising side frames, traction wheels and ground rollers supporting said frames, a stationary knife and a rotary cutter operatively connected to a traction wheel, by pawl and ratchet mechanism, of a vertically and transversely disposed yoke pivotally connected to the side frames of each unit, a transverse frame bar pivotally connected to the yokes of a plurality of mower units of one rank, a draft bar connected to the yoke of a mower unit of another rank, connections between said draft bar and said frame bar, including a pivotal connection, means for holding the cutting units connected with said frame bar out of operative position, a supporting device carried by said draw bar, for holding the adjacent mower unit out of operative relation, the yoke connected with said draft bar being detachably and reversibly connected to said mower unit to permit said unit to be reversed to avoid driving the rotary cutter.

16. In a gang mower, the combination with a plurality of mower units arranged in a plurality of ranks, each unit comprising side frames, traction wheels and ground rollers supporting said frames, a stationary knife and a rotary cutter operatively connected to a traction wheel, of a vertically and transversely disposed yoke pivotally connected to the side frames of each unit, a transverse frame bar pivotally connected to the yokes of a plurality of mower units of one rank, a draft bar connected to the yoke of a mower unit of another rank, connections between said draft bar and said frame bar, including a pivotal connection, means for holding the cutting units connected with said frame bar out of operative position, a sleeve movable longitudinally on said draft bar, and provided with a hook for engaging parts connected with the adjacent mower unit forward of or in rear of the rotary cutter thereof, said mower unit being detachably connected to its yoke to permit the reversing of the mower unit with respect to the yoke.

17. In a gang lawn mower, the combination with a plurality of mower units arranged in a plurality of ranks, each comprising side frames provided with yoke engaging pivot lugs, supporting traction wheels and ground rollers, a stationary knife and a rotary cutter, and driving connections including pawl and ratchet mechanism connecting said rotary cutter to a traction wheel, of a yoke for each of said mowers pivotally and detachably engaging said pivot lugs, a transverse frame bar connected by horizontal pivots with the yokes of the mower units of one rank, a draft bar connected with the yoke of a mower unit of another rank, and having a pivotal connection with a part connected with said frame bar, whereby said mower units may be reversed within said yokes and drawn in such manner that the rotary cutters will not be rotated.

18. In a gang lawn mower, the combination with a plurality of mower units arranged in a plurality of ranks, each comprising side frames provided with yoke engaging pivot lugs, supporting traction wheels and ground rollers, a stationary knife and a rotary cutter, and driving connections including pawl and ratchet mechanism connecting said rotary cutter to a traction wheel, of a yoke for each of said mowers pivotally and detachably engaging said pivot lugs, a transverse frame bar connected by horizontal pivots with the yokes of the mower units of one rank, a draft bar connected with the yoke of a mower unit of another rank, and having a pivotal connection with a part connected with said frame bar, and means for holding the cutting mechanism of said mower units out of operative relation with the ground.

19. In a gang lawn mower the combination with a plurality of mower units arranged in a plurality of ranks, of a yoke pivotally connected to each unit, a transverse frame bar for connecting a plurality of units of one rank, pivotal connections between said frame bar and the yokes of said units, a reach bar connected to said frame bar, and a draft bar connected to a yoke of a mower unit in another rank, and having a pivotal connection with said reach bar, located substantially at or below the level of the pivotal connection of said yoke with its mower unit, whereby the forward draft of the machine will tend to increase the traction of the mower unit.

20. In a gang lawn mower the combination with a plurality of mower units arranged in different ranks, and each provided with cutting mechanism and traction wheels for operating the same, a main frame connected with and supported by the units of the front rank, each trailing unit of the rear rank being provided with a forwardly extending draft bar provided at its rear end with means pivotally connected with the mower unit and at its forward end with a pivotal connection with a part connected with the main frame, and located below the level of the said pivotal connections with the trailing unit.

In testimony whereof I affix my signature.
CLELAND COLDWELL ROSS.